March 11, 1958 A. NEWTON 2,826,748

SATURABLE VARIABLE INDUCTOR

Filed March 26, 1956

INVENTOR.
ARNOLD NEWTON.

BY Wm. J. Kelly Jr.

ATTORNEY.

2,826,748
United States Patent Office
Patented Mar. 11, 1958

2,826,748

SATURABLE VARIABLE INDUCTOR

Arnold Newton, Forest Hills, N. Y., assignor to F-R Machine Works, Inc., Woodside, N. Y., a corporation of New York Application March 26, 1956, Serial No. 573,889

7 Claims. (Cl. 336—155)

Figure 1:
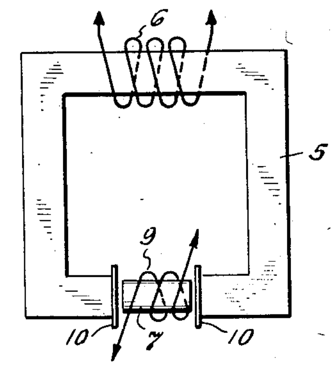

The present invention relates to saturable variable inductors and more especially to such inductors wherein the inductance range is substantially increased, thus rendering the inductors of the present invention particularly applicable to radio-frequency circuits, pulse and magnetic memory circuits, and to high frequency magnetic amplifiers.

Variable saturable inductance arrangements are known in the prior art but up to the present the control thereof has resided exclusively in the direct utilization of the variable permeability phenomenon of certain magnetic materials upon inductance, when said materials are subjected to a saturating magnetic field. The maximum inductance range attainable with the conventional arrangement is restricted to the ratio of inductance of the coil incorporating the saturable magnetic material in its core when the material exhibits maximum permeability to the inductance of the same coil, when the permeability of the magnetic material is reduced to unity, a condition prevailing when the magnetic material is fully saturated by a magnetic field. In contradistinction, the present invention enables a further reduction of inductance upon saturation, thereby increasing the range, by the utilization of a combination of materials having predetermined properties.

For example, certain high permeability materials have the ability to increase the inductance of a coil and to provide magnetic shielding by concentrating magnetic flux in the magnetic material while at the same time such magnetic material is susceptible to permeability control by means of a magnetic field.

The introduction of a nonmagnetic conductive material with the magnetic material interposed between it and the coil, of which this combination forms the core, will exert little effect upon the inductance of the coil when the permeability is high because of the shielding effect of the magnetic material, while at the same time will also contribute materially to the reduction of inductance upon saturation as a result of coupling to the coil of the conductive element of the core.

It is emphasized that the function of the conductive element is distinct from that of a shield, which is generally incorporated between the signal and control elements of the device. The shield is employed for the sole purpose of reducing losses and maintaining high Q, by minimizing coupling to the yoke and/or the control winding which may be subject to loss at frequencies associated with the voltage in the signal winding. Nevertheless, the conductive element of the present invention may be so arranged as to provide shielding in addition to its primary function of extending the inductance range. The shielding action, however, is incidental and is not the subject matter of any patent claims.

It is accordingly the primary object of the present invention to provide a saturable variable inductor in which a saturable magnetic material is employed in combination with a conductive medium so arranged as to take advantage of the high relative permeability of the magnetic material in the absence of a saturating magnetic field, while at the same time allowing the conductive medium to reduce the inductance by virtue of its coupling effect when a magnetic field is applied and saturation is approached.

Figure 2:
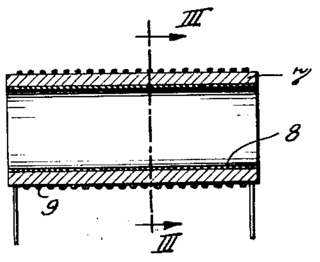
Figure 9:
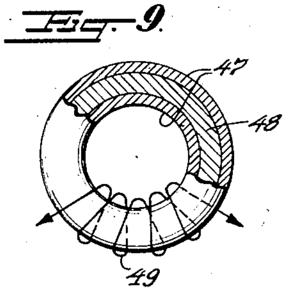
Figure 3:
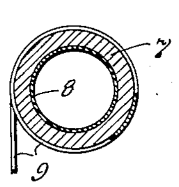
Figure 4:
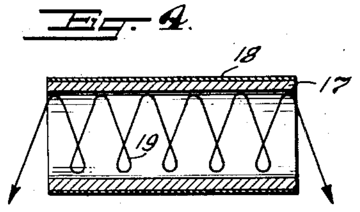
Figure 5:
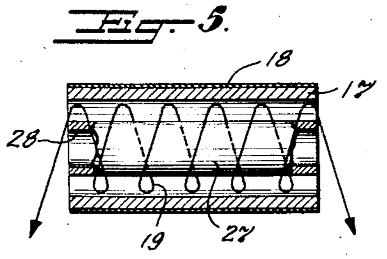
Figure 6:
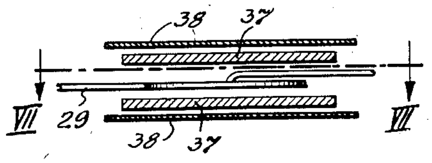
Figure 7:
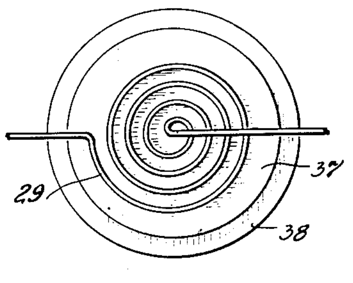
Figure 8:
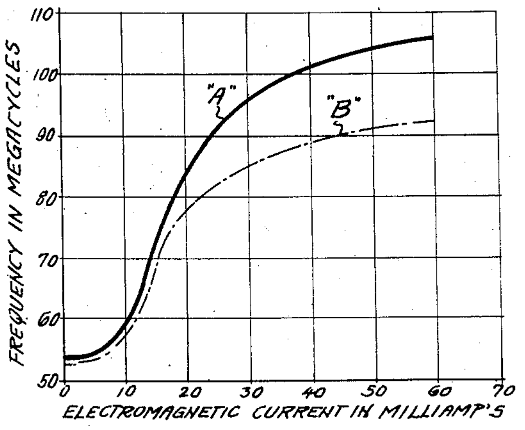

Still further objects of the present invention will become obvious to those skilled in the art by reference to the accompanying drawing, wherein:

Figure 1 is a schematic illustration of a working model wherein a saturable variable inductor of the present invention is used, Fig. 2 is a sectional view of the saturable element placed in the gap as shown in Fig. 1, Fig. 3 is a sectional view taken on the line III—III of Fig. 2, Fig. 4 is a view similar to that of Fig. 2 but showing a slightly different modification which the present invention may take, Fig. 5 is also a sectional view of another modification which the present invention may take, Fig. 6 is another sectional view which a still further modification of the present invention may take, Fig. 7 is a sectional plan view taken on the line VII—VII of Fig. 6, Fig. 8 is a graphic illustration showing the operating characteristics of a saturable variable inductor constructed in accordance with the present invention compared with inductors of the prior art and in which the abscissa represents electromagnet current in milliamperes and the ordinate represents tuned frequency in megacycles, and Fig. 9 shows a toroidal configuration embodying the principles of the present invention wherein the core of the toroidal ring contains the nonmagnetic conductive substance while the saturable magnetic material forms the outside surface.

Referring now to the drawing in detail, the working model wherein the present invention was tested is shown in Fig. 1. It comprises a saturating reactor yoke 5 of magnetic material, such as iron or a suitable alloy, having a gap in its core and provided with an electromagnet control winding 6 surrounding a portion of this yoke. Positioned in the gap of the yoke 5 is a tube 7 of high permeability saturable material, such as ferrite or the like, and a nonmagnetic conductive material 8, such as silver, copper, brass, aluminum or the like, is inserted into or coated over the interior surface of the tube 7, as shown more clearly in Figs. 2 and 3. A coil 9, which forms part of the signal circuit in operation of the inductor, is wound about the tube 7 of saturable material and suitable shields 10 of a metallic foil, such as silver, copper, or the like, may be interposed between the ends of the tube 7 and the adjacent ends of the reactor yoke 5 for the sole purpose of minimizing coupling between winding 9 and yoke 5 and/or winding 6 thereby reducing circuit losses and maintaining high Q, as is well known in the art.

The inductance of the coil 9, normally included in the signal circuit, will inherently be increased in a well known manner by the insertion of a high permeability core, such as the ferrite tube 7, in its field. However, the inductance of such coil 9 will be materially reduced if, instead of the high permeability core represented by the tube 7, a high conductivity nonmagnetic material, such as a tube or rod of silver, copper or the like 8, is introduced in its field. By surrounding this tube of electrically conductive nonmagnetic material 8 with a high permeability magnetic material such as the ferrite tube 7, the inductance of the coil 9 is again increased and the coupling effect of the conductive tube or rod 8 is minimized because of the higher concentration of magnetic flux in the magnetic material 7. This magnetic tube 7 thus acts as a magnetic shield reducing the coupling between the coil 9 and the conductive tube or rod 8. Saturation of the magnetic member will reduce the permeability to unity making it equivalent to the withdrawal of the magnetic material 7 from the field of coil 9, with attendant reduction of its inductance in the signal circuit due to coupling of coil 9 to conductive member 8.

The change in the inductance range is determined by the ratio of the inductance of coil 9 when the core is formed of a high permeability material and the inductance of this same coil when the magnetic core is replaced by a nonmagnetic conductive material. By reference to Fig. 8 it will be readily seen from curve "A," representing oscillator frequency when coil 9 was connected in a tuned circuit of an oscillator employing the composite magnetic and nonmagnetic conductive core of the present invention, that the ratio of the inductance range is substantially higher than is provided by a core of magnetic material and air alone, as shown by curve "B" of Fig. 8. This ratio can, in most cases, be still further increased by a reduction in the wall thickness of the saturable magnetic tube 7 by virtue of closer coupling to the conducting surface 8.

It should thus be apparent that the same or improved results can be obtained from other physical embodiments of the present invention. For example, a higher magnetic circuit efficiency can often be obtained by introducing the coil 19 into the interior of the magnetic tube 17 and placing the nonmagnetic conductive material 18 on the exterior, as shown in Fig. 4, or two coaxial tubes 17 and 27 of magnetic material utilized, with the nonmagnetic conductive material 28 being also disposed interiorly of the tube 27 as well as exteriorly of the tube 17, such as at 18, and shown in Fig. 5. As a still further embodiment, the saturable variable inductor of the present invention may take the form of a planar helical coil 29 sandwiched between two thin magnetic ferrite wafers 37 and having nonmagnetic exterior surfaces 38, which structure is considered capable of high efficiency and range.

A still further increase in efficiency is attainable through the use of the configuration of Fig. 9, wherein a composite toroidal reactor is used comprising a saturable material 47 on the outer surface thereof in close proximity to the coil 49 and having a core of nonmagnetic conductive material 48.

In addition to the primary objective of extended inductance range, a saturable variable inductor constructed in accordance with the present invention possesses several other advantages. For example, it is generally found that hysteresis effects are most marked at high levels of permeability and low levels of magnetic flux density. Using any of the composite core arrangements in the manner above described it is possible to realize a given inductance range by shifting the quiescent flux to a more favorable operating point on the magnetization curve where a reduction of hysteresis effects results at the same time.

The increased range at higher relative flux densities is apparent from Fig. 8. It frequently happened that certain high permeability materials could not heretofore be utilized to good advantage because of excessive losses at high frequencies with low levels of magnetic flux but such drawback is substantially reduced when such high permeability materials are now employed using a composite core in accordance with the present invention, by affording increased range at higher flux levels.

It should thus become obvious to those skilled in the art that a saturable variable inductor has been herein provided in which the inductance range has been substantially extended which thus increases the usefulness of such inductors and wherein improved high-frequency performance is achieved together with a reduction in hysteresis effects. Moreover, it should be equally apparent that the present invention is not restricted to any particular arrangement of the controlling element. A permanent magnet arrangement may, for instance, be employed to bring about control of the saturating field, and mechanical movement may be substituted for electromagnet current control. Also, in certain applications a single core and/or a single winding may be used for the control and signal functions. Such applications would include magnetic memory circuits, pulse and switching circuits.

Although several embodiments of the present invention have been herein shown and described, it will be understood that still further modifications of the same may be made without departing from the spirit and scope of the appended claims.

I claim:

1. A saturable inductor comprising a yoke of magnetic material having an air-gap therein, a control winding surrounding said yoke, a composite core having a saturable ferromagnetic member disposed in the air-gap of said yoke, a coil in close proximity to said ferromagnetic member, and a nonmagnetic electrically conductive member separated from the coil by the interposition of said magnetic member, said nonmagnetic electrically conductive member being essentially shielded from said coil when the permeability of said juxtapositioned saturable ferromagnetic member is high and said nonmagnetic electrically conductive member being coupled to said coil when saturation is approached, thus reducing the inductance and extending the range of said inductor.

2. A saturable variable inductor of increased inductance range comprising a yoke of magnetic material provided with an air-gap therein, a control coil wound about a portion of said yoke for controlling the magnetic field in the air-gap of said yoke by variation of the current through said coil, a signal winding disposed in the air-gap of said yoke, a high permeability saturable magnetic member concentrically disposed relative to said signal winding and in said air-gap for increasing the inductance of said signal winding, and a nonmagnetic electrically conductive material concentric with said signal winding but separated from it by said high permeability saturable magnetic member for reducing the inductance of said signal winding when a magnetic field is applied to said high permeability saturable magnetic member by flow of control current through said control coil and saturation of said magnetic member is approached, for the purpose of increasing the overall inductance range of said saturable variable inductor.

3. A saturable variable inductor of increased inductance range comprising a yoke of magnetic material provided with an air-gap therein, a control coil wound about a portion of said yoke for controlling the magnetic field in the air-gap of said yoke by variation of the current through said coil, a signal winding disposed in the air-gap of said yoke, a high permeability saturable magnetic member concentrically disposed relative to said signal winding in said air-gap for increasing the inductance of said signal winding, metallic nonmagnetic shields disposed in said air-gap between the ends of said yoke and the ends of said high permeability saturable magnetic member to prevent the signal from said signal winding being induced in said control coil or yoke and thus minimizing circuit losses, and a nonmagnetic electrically conductive material concentric with said signal winding but separated from it by said high permeability saturable magnetic member for reducing the inductance of said signal winding when a magnetic field is applied to said high permeability saturable magnetic member by flow of control current through said control coil and saturation of said magnetic member is approached, for the purpose of increasing the overall inductance range of said saturable variable inductor.

4. A saturable variable inductor of increased inductance range comprising a yoke of magnetic material provided with an air-gap therein, a control coil wound about a portion of said yoke for controlling the magnetic field in the air-gap of said yoke by variation of the current through said coil, a signal winding disposed in the air-gap of said yoke, a high permeability saturable magnetic tubular member disposed interiorly of said winding and supporting the same for increasing the inductance of said signal winding, and a layer of nonmagnetic electrically conductive material on the interior surface of said magnetic tubular member for reducing the inductance of said signal winding when a magnetic field is applied to said high permeability saturable magnetic tubular member by flow of control current through said control coil and saturation of said magnetic tubular member is approached, for the purpose of increasing the overall inductance range of said saturable variable inductor.

5. A saturable variable inductor of increased inductance range comprising a yoke of magnetic material provided with an air-gap therein, a control coil wound about a portion of said yoke for controlling the magnetic field in the air-gap of said yoke by variation of the current through said coil, a signal winding disposed in the air-gap of said yoke, a high permeability saturable magnetic tubular member disposed about said winding and supported by the latter for increasing the inductance of said signal winding, and a nonmagnetic electrically conductive material on the exterior surface of said magnetic tubular member for reducing the inductance of said signal winding when a magnetic field is applied to said high permeability saturable magnetic tubular member by flow of control current through said control coil and saturation of said magnetic tubular member is approached, for the purpose of increasing the overall inductance range of said saturable variable inductor.

6. A saturable variable inductor of increased inductance range comprising a yoke of magnetic material provided with an air-gap therein, a control coil wound about a portion of said yoke for controlling the magnetic field in the air-gap of said yoke by variation of the current through said coil, a signal winding disposed in the air-gap of said yoke, a pair of concentric high permeability saturable magnetic tubular members concentric with said signal winding, one of said tubular members being inside said winding and supporting the same and the other of said tubular members surrounding said winding and inner tubular member, for increasing the inductance of said signal winding, and a nonmagnetic electrically conductive material covering the interior surface of said inner magnetic tubular member and the exterior surface of said outer magnetic tubular member for reducing the inductance of said signal winding when a magnetic field is applied to said high permeability concentric saturable magnetic tubular members by flow of control current through said control coil and saturation of said magnetic tubular members is approached, for the purpose of increasing the overall inductance range of said saturable variable inductor.

7. A composite core for a saturable variable inductor comprising a flat spirally wound signal winding, a pair of high permeability saturable magnetic disc-like members disposed on each side of said flat spiral winding for increasing the inductance of said signal winding, and a thin disc-like nonmagnetic electrically conductive material covering said magnetic disc-like members on the side of each opposite to that adjacent said flat spiral winding for reducing the inductance of said signal winding when a magnetic field is applied to said disc-like magnetic members and saturation of said disc-like magnetic members is approached, for increasing the overall inductance range of the saturable variable inductor employing said composite core.

References Cited in the file of this patent

UNITED STATES PATENTS

| | | |
|---|---|---|
| 2,361,542 | Gumley | Oct. 31, 1944 |
| 2,628,342 | Taylor | Feb. 10, 1953 |
| 2,633,561 | Hewlett | Mar. 31, 1953 |

OTHER REFERENCES

Electronics, July, 1953, "Simplified Horizontal Deflection Generator," p. 171.